United States Patent
Hakamata et al.

(10) Patent No.: US 8,097,345 B2
(45) Date of Patent: *Jan. 17, 2012

(54) GAS BARRIER FILM, GAS BARRIER LAMINATE AND METHOD FOR MANUFACTURING FILM OR LAMINATE

(75) Inventors: Tomoyoshi Hakamata, Ibaraki (JP); Akira Nomoto, Ibaraki (JP); Osamu Nakamura, Ibaraki (JP); Yoshihisa Inoue, Chiba (JP); Kou Tsurugi, Chiba (JP); Nobuhiro Tanabe, Chiba (JP); Yoshihiro Yamamoto, Chiba (JP)

(73) Assignee: Tohcello Co., Ltd., Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 12/065,395

(22) PCT Filed: Aug. 30, 2006

(86) PCT No.: PCT/JP2006/317591
§ 371 (c)(1),
(2), (4) Date: Oct. 28, 2008

(87) PCT Pub. No.: WO2007/026935
PCT Pub. Date: Mar. 8, 2007

(65) Prior Publication Data
US 2009/0269592 A1    Oct. 29, 2009

(30) Foreign Application Priority Data

Aug. 31, 2005  (JP) ................................. 2005-250395
Nov. 9, 2005   (JP) ................................. 2005-325419

(51) Int. Cl.
*B32B 27/00* (2006.01)
*B05D 3/02* (2006.01)

(52) U.S. Cl. ..................... 428/500; 427/372.2; 427/384; 427/385.5; 427/387

(58) Field of Classification Search .......................... None
See application file for complete search history.

(56) References Cited

U.S. PATENT DOCUMENTS

| | | | | |
|---|---|---|---|---|
| 3,856,643 | A | * | 12/1974 | Nakamoto et al. ............... 522/96 |
| 4,298,698 | A | * | 11/1981 | Kawase et al. ................... 521/27 |
| 4,486,489 | A | * | 12/1984 | George ......................... 428/220 |
| 5,739,232 | A | * | 4/1998 | Hazell et al. ................... 526/240 |
| 6,143,384 | A | * | 11/2000 | Tanaka et al. ................. 428/35.8 |
| 6,472,470 | B1 | | 10/2002 | Fujiwara et al. |
| 7,476,712 | B2 | * | 1/2009 | Tanaka et al. ............... 525/330.2 |
| 2005/0131162 | A1 | | 6/2005 | Tanaka et al. |

FOREIGN PATENT DOCUMENTS

| | | |
|---|---|---|
| JP | 61-81405 A | 4/1986 |
| JP | 10-273506 A | 10/1998 |
| JP | 2000-309607 A | 11/2000 |
| JP | 2004-18806 A | 1/2004 |
| JP | 2004-143197 A | 5/2004 |
| JP | 2005-125693 A | 5/2005 |
| WO | 03/091317 A1 | 11/2003 |

OTHER PUBLICATIONS

International Search Report of PCT/JP2006/317591, date of mailing Dec. 12, 2006.

* cited by examiner

*Primary Examiner* — Monique Jackson
(74) *Attorney, Agent, or Firm* — Westerman, Hattori, Daniels & Adrian, LLP

(57) ABSTRACT

Disclosed is an excellent gas barrier laminate whose gas-barrier property has little dependency on temperature and which hardly causes fracture even when the laminate is stretched. A gas barrier film comprising a polymer (A) of an unsaturated carboxylic acid compound monovalent metal salt (a), wherein the polymer (A) contains a modified vinyl alcohol polymer (B); a gas barrier laminate comprising a base layer and the gas barrier film formed on at least one surface of the base layer; and a method for production of a gas barrier laminate comprising the steps of: coating a solution of an unsaturated carboxylic acid compound monovalent metal salt (a) having a polymerization degree less than 20 on at least one surface of a base layer, wherein the solution contains a modified vinyl alcohol polymer (B); performing the polymerization to form a layer of the polymer (A) of the unsaturated carboxylic acid compound monovalent metal salt (a) containing the modified vinyl alcohol polymer (B).

11 Claims, No Drawings

GAS BARRIER FILM, GAS BARRIER LAMINATE AND METHOD FOR MANUFACTURING FILM OR LAMINATE

TECHNICAL FIELD

The present invention relates to a gas barrier film that is transparent and has gas barrier properties against oxygen, water vapor and the like, particularly gas barrier layers with excellent gas barrier properties under high humidity and low humidity conditions and toughness suited to packaging materials, and to a gas barrier laminate, as well as a manufacturing method therefor.

BACKGROUND ART

Packaging materials wherein the gas barrier layer is made of aluminum or other metal foil, which resists the effects of temperature and humidity, have conventionally been used as barrier materials against oxygen, water vapor and the like, but the problem in this case is that it is not possible to see through the packaging materials and verify the contents. In recent years, therefore, attention has focused on transparent gas barrier films formed by depositing an inorganic oxide such as silicon oxide, aluminum oxide or the like by vacuum deposition, sputtering, ion plating, chemical vapor epitaxy or the like on a film substrate.

The problem is that such transparent gas barrier films are normally obtained by depositing an inorganic oxide on the surface of a substrate consisting of a tough, transparent biaxially oriented polyester film, left as is the deposited layer is vulnerable to abrasion and the like during use, and when the film is used as a packaging film, the gas barrier properties may be adversely affected by cracks in the inorganic that occur due to abrasion and stretching during subsequent printing or lamination or during filling with the contents, so satisfactory gas barrier properties cannot be achieved simply by inorganic oxide deposition.

Methods that have been proposed for solving this problem include a method laminating a polyvinyl alcohol with gas barrier properties over a metal oxide thin film (see for example, Patent Document 1), a laminated film obtained by coating the surface of a deposited layer of an inorganic compound with a coating agent consisting primarily of an aqueous solution or mixed water/alcohol solution of a water-soluble polymer and at least one of (a) 1 or more metal alkoxides and/or hydrolysates thereof and (b) tin chloride (Patent Document 2), a laminated film obtained by applying a coating composition consisting of a specific organosilane, a silyl group-containing fluorine polymer and an organopolysiloxane (Patent Document 3), a gas barrier coating film obtained by applying a coating agent comprising a polyvinyl alcohol-based resin and a metal alcoholate (Patent Document 4), and a method for manufacturing a gas barrier film by first forming a film of a composition consisting primarily of poly (meth)acrylic acid and a polyalcohol polymer, and then heat treating the film and immersing it in a medium containing a metal (Patent Document 5).

However, coated films consisting of alkoxides and the like are not very tough, and may crack or lose their gas barrier properties under conditions of use as packaging materials.

The oxygen barrier properties of barrier films obtained by laminating polyvinyl alcohol may decline under highly humid conditions, and in order for a composition of poly (meth)acrylic acid and a polyalcohol polymer to obtain barrier properties under highly humid conditions, it must undergo high-temperature treatment for at least 5 minutes at 180 to 200° C.

Patent Document 1: Japanese Patent Application Laid-open No. H6-316025 (claim 1)
Patent Document 2: Japanese Patent No. 2790054 (claim 1)
Patent Document 3: Japanese patent Application Laid-open No. 2000-63752 (claims 7, 11)
Patent Document 4: Japanese Patent Application Laid-open No. 2002-173631 (claims 1, 11)
Patent Document 5: Japanese Patent Application Laid-open No. H10-237180 (claim 15)

DISCLOSURE OF THE INVENTION

It is therefore an object of the present invention to provide a gas barrier film and gas barrier laminate that are tough and the gas barrier properties of which have little dependence on humidity.

The present invention, which is proposed in order to achieve this object, provides a gas barrier film comprising a polymer of an unsaturated carboxylic acid compound polyvalent metal salt (a), the polymer containing a modified vinyl alcohol polymer (B), or preferably of a polymer of an unsaturated carboxylic acid compound polyvalent metal salt (a), wherein the content of the modified vinyl alcohol polymer (B) is 50 wt % or less, or preferably of a polymer of an unsaturated carboxylic acid compound polyvalent metal salt (a), wherein the polymer contains a modified vinyl alcohol polymer (B) and gives an infrared absorption spectrum in which the ratio of absorbance $A_0$ near 1700 cm$^{-1}$ attributable to the vC=O of the carboxyl acid groups to absorbance A near 1520 cm$^{-1}$ attributable to the vC=O of the carboxylate ions ($A_0$/A) is less than 0.25, as well as a gas barrier laminate obtained by laminating this gas barrier film on a substrate layer.

The present invention also provides a method for manufacturing a gas barrier film or gas barrier laminate by first applying a solution of a polyvalent metal salt of an unsaturated carboxylic acid compound having a degree of polymerization of less than 20, wherein the solution contains modified vinyl alcohol polymer (B) or preferably modified vinyl alcohol polymer (B) in the amount of 50 wt % or less, or else applying a solution containing a polyvalent metal compound and an unsaturated carboxylic acid compound with a degree of polymerization of less than 20, and also containing modified vinyl alcohol polymer (B) or preferably modified vinyl alcohol polymer (B) in the amount of 50 wt % or less, to at least one side of substrate layer (C), and then forming polymer (A) of unsaturated carboxylic acid compound polyvalent salt (a) wherein the polymer also contains modified vinyl alcohol polymer (B).

A gas barrier film consisting of polymer (A) of unsaturated carboxylic acid compound polyvalent metal salt (a), wherein the polymer contains modified vinyl alcohol polymer (B) or preferably modified vinyl alcohol polymer (B) in the amount of 50 wt % or less, is transparent, has gas barrier properties with respect to oxygen, water vapor and the like, and in particular has gas barrier properties under high humidity and low humidity conditions, as well as being flexible. By using a solution containing unsaturated carboxylic acid compound polyvalent salt (a) having a degree of polymerization of less than 20 and modified vinyl alcohol polymer (B), and preferably a solution containing modified vinyl alcohol polymer (B) in the amount of 50 wt % or less, the method for manufacturing a gas barrier film or gas barrier laminate of the present invention makes it easy to coat not only a film substrate but also any form of substrate, and also makes it easy to manufacture a flexible film which is highly neutralized or in other words has excellent gas barrier properties, consisting of a layer of polymer (A) of unsaturated carboxylic acid compound polyvalent metal salt (a), wherein the polymer contains modified vinyl alcohol polymer (B).

BEST MODE FOR CARRYING OUT THE INVENTION

Unsaturated Carboxylic Acid Compound

The unsaturated carboxylic acid compound used to form unsaturated carboxylic acid compound polyvalent metal salt (a) in the present invention is a carboxylic acid compound such as acrylic acid, methacrylic acid, maleic acid or itaconic acid having an $\alpha,\beta$-ethylenically unsaturated group, and has a degree of polymerization of less than 20 or preferably is a monomer or a polymer with a degree of polymerization of 10 or less. This is because if a polymer (high-molecular-weight compound) with a degree of polymerization above 20 is used, it will not completely form a salt with the polyvalent metal compound discussed below, and the layer obtained by copolymerization of this metal salt with modified vinyl alcohol polymer (B) will have inferior gas barrier properties under conditions of high humidity. One such unsaturated carboxylic acid compound or a mixture of two or more may be used.

Of these unsaturated carboxylic acid compounds, a monomer is preferred because it easily forms a salt which is entirely neutralized by the polyvalent metal compound, and a gas barrier laminate formed by laminating a copolymer layer obtained by copolymerization of this salt on at least one surface of a substrate layer has particularly good gas barrier properties under high humidity conditions.

Polyvalent Metal Compound

The polyvalent metal compound which is a component forming unsaturated carboxylic acid compound polyvalent metal salt (a) in the present invention is a metal or metal compound belonging to one of groups 2A through 7A, groups 1B through 3B and group 8 of the periodic table, and specific examples include magnesium (Mg), calcium (Ca), strontium (Sr), barium (Ba), iron (Fe), cobalt (Co), nickel (Ni), copper (Cu), zinc (Zn), aluminum (Al) and other bivalent or higher metals and oxides, hydroxides, halides, carbonates, phosphates, phosphites, hypophosphites, sulfates and sulfites and the like of these metals. Of these metal compounds, a bivalent metal compound is preferred, and magnesium oxide, calcium oxide, barium oxide, zinc oxide, magnesium hydroxide, calcium hydroxide, barium hydroxide, zinc hydroxide or the like is especially desirable. Using these bivalent metal compounds, a film obtained by polymerizing a salt thereof with the aforementioned unsaturated carboxylic acid compound has particularly good gas barrier properties under high humidity conditions. At least one such polyvalent metal compound is used, and one only may be used or two or more may be used in combination. Of these polyvalent metal compounds, Mg, Ca, Zn, Ba and Al are preferred, and Zn is especially preferred.

Unsaturated Carboxylic Acid Compound Polyvalent Metal Salt (a)

The unsaturated carboxylic acid compound polyvalent metal salt (a) which is one component forming a gas barrier film consisting of polymer (A) (sometimes called simply "polymer (A)" below) of unsaturated carboxylic acid compound polyvalent metal salt (a) wherein the polymer also contains modified vinyl alcohol polymer (B) in the present invention is a salt of the aforementioned polyvalent metal compound with the aforementioned unsaturated carboxylic acid compound with a degree of polymerization of less than 20. One such unsaturated carboxylic acid compound polyvalent metal salt (a) may be used, or a mixture of two or more may be used. Zinc (meth)acrylate is particularly desirable for unsaturated carboxylic acid compound polyvalent metal salt (a) because it provides excellent hot water resistance of the resulting polymer layer.

Vinyl Alcohol Polymer

The vinyl alcohol polymer which is the base substance for modified vinyl alcohol polymer (B) in the present invention is a polymer consisting primarily of vinyl alcohol, and is normally obtained by saponifying polyvinyl acetate. It may also contain 19 mol % or less or preferably 15 mol % or less of ethylene.

A polymer with a degree of polymerization in the range of 100 to 3000 or preferably 300 to 2000 is normally used for this vinyl alcohol polymer. From the standpoint of the gas barrier properties of polymer (A), which is obtained by polymerization with unsaturated carboxylic acid compound polyvalent metal salt (a), it should be highly saponified, with a degree of saponification of 70 to 99.9% or preferably 85 to 99.9%.

Modified Vinyl Alcohol Polymer (B)

The modified vinyl alcohol polymer (B) which is one component making up a gas barrier film consisting of polymer (A) of the present invention is modified by adding various known groups having reactivity (reactive groups) to the aforementioned vinyl alcohol polymer to thereby bind the reactive groups by substitution, esterification or the like, and may be a soap of a copolymer obtained by copolymerizing a vinyl ester such as vinyl acetate with an unsaturated compound having reactive groups, but is not particularly limited as long as the polymer has reactive groups in the molecule.

This modified vinyl alcohol polymer (B) may normally be one with a degree of polymerization in the range of 100 to 3000 or preferably 300 to 2000.

From the standpoint of the gas barrier properties of the polymer (A) obtained by polymerization with unsaturated carboxylic acid compound polyvalent metal salt (a), it is preferable to use a highly saponified polymer, with a degree of saponification, 70 to 99.9% or more preferably 85 to 99.9%.

Specific examples of the reactive groups in modified vinyl alcohol polymer (B) include (meth)acrylate, (meth)acryloyl, (meth)acrylamide, vinyl, allyl, styryl, thiol, silyl, acetoacetyl and epoxy groups and the like. The amount of reactive groups in modified vinyl alcohol polymer (B) can be determined appropriately, but since the intrinsic gas barrier properties of the vinyl alcohol polymer used as the base substance will be adversely affected if the amount of OH groups therein is reduced, the amount of reactive groups is normally in the range of 0.001 to 50 mol % (given 100 mol % as the total of reactive groups and OH groups). Modified vinyl alcohol polymer (B) is preferably soluble in water, a lower alcohol or an organic solvent or the like, and it is especially desirable that it be soluble in either water or a water-lower alcohol mixed solvent.

If this modified vinyl alcohol polymer (B) which has been modified with reactive groups is used as one component and mixed and polymerized with unsaturated carboxylic acid compound polyvalent metal salt (a), it is possible to obtain a gas barrier film with improved gas barrier properties under low-humidity conditions, consisting of polymer (A) in which at least part of unsaturated carboxylic acid compound polyvalent metal salt (a) and modified vinyl alcohol polymer (B) have formed some kinds of bonds.

Specific examples of this modified vinyl alcohol polymer (B) include (meth)acrylate group-modified vinyl alcohol polymer (B1), wherein (meth)acrylate groups are introduced by reacting some of the OH groups in the vinyl alcohol polymer used as the base substance with a carboxylic acid compound such as acrylic acid, methacrylic acid, maleic acid, fumaric acid or itaconic acid having α,β-ethylenically unsaturated groups, or a derivative thereof;

thiol group-modified vinyl alcohol polymer (B2), wherein thiol (—SH) groups are introduced into some of the OH groups in the vinyl alcohol polymer used as the base substance by a method whereby vinyl acetate is copolymerized with an isothiuronium salt or a vinyl monomer having a thiol acid ester, and the resulting polymer is decomposed with an acid or base into thiol groups; a method in which reactive functional groups are introduced into the side chains of a vinyl alcohol polymer by a polymerization reaction; or a method in which a vinyl ester is polymerized in the presence of a thiol acid, and the resulting polymer is saponified to thereby introduce thiol groups only at the ends of the molecules;

silyl group-modified vinyl alcohol polymer (B3) having trimethoxysilane groups, triethoxysilane groups or other trialkoxysilane groups or tricarbonyloxysilane groups or the like introduced into part of the OH groups of the vinyl alcohol polymer used as the base substance, which is obtained by a method in which a silylating agent such as an organohalogen silane, organoacetoxy silane or organoalkoxy silane is used to introduce silyl groups by post-modification into a vinyl alcohol polymer or a vinyl acetate polymer having carboxyl groups or hydroxyl groups; or a method in which a copolymer of vinyl acetate with a silyl group-containing olefinically unsaturated compound such as a vinyl silane or (meth)acrylamide-alkyl silane is saponified to introduce alkoxysilyl groups, acyloxysilyl groups or silanol groups (which are hydrolysates of these) or salts thereof or the like into the molecules or the like;

acetoacetyl group-modified vinyl alcohol polymer (B4) having acetoacetyl groups in some of the OH groups of the vinyl alcohol polymer used as the base substance, which is obtained by a method of dispersing a vinyl alcohol polymer in an acetic acid solvent and then adding Diketene thereto; or by a method of first dissolving a vinyl alcohol polymer in a solvent such as dimethylformamide, dioxane or the like, and then adding Diketene thereto; or a method in which Diketene gas or liquid Diketene is brought into direct contact with a vinyl alcohol polymer or the like;

and other modified vinyl alcohol polymers having epoxy groups, glycidyl ether groups and other cation polymerizable groups added thereto and modified vinyl alcohol polymers having (meth)acrylamide groups, allyl groups, vinyl groups, styryl groups, intramolecular double bonds, vinyl ether groups and other radical polymerizable groups added inside the molecule by a variety of known methods such as a method of introducing reactive functional groups into the side chains by copolymerizing vinyl acetate with a monomer having reactive functional groups, and then saponifying the copolymer, a method of introducing reactive functional groups into the side chains of polyvinyl alcohol by a polymer reaction, and a method of introducing reactive functional groups into the termini by a chain transfer reaction and the like.

Of these modified vinyl alcohol polymers (B), a gas barrier film comprising a polymer (A) obtained using (meth)acrylate group-modified vinyl alcohol polymer (B1) has excellent gas barrier properties (oxygen barrier properties) under high humidity and low humidity conditions, does not lose its gas barrier properties after hot water treatment (is hot water resistant) and is flexible, and when a layered body (laminated film) formed with this gas barrier film is used as a packaging material or the like, it has improved heat seal strength.

(Meth)Acrylate Group-Modified Vinyl Alcohol Polymer (B1)

In the aforementioned (meth)acrylate group-modified vinyl alcohol polymer (B1), the amount of (meth)acryloyl groups (relative to —OH groups; that is, the esterification rate) is preferably in the range of 0.001 to 50% or more preferably 0.1 to 40%. If the esterification rate is under 0.001%, the hot water resistance, flexibility and the like of the resulting gas barrier film will not be improved, while if it exceeds 50% the hot water resistance, oxygen barrier properties and the like of the resulting gas barrier film will also not be improved.

The (meth)acrylate group-modified vinyl alcohol polymer (B1) of the present invention can be obtained for example by reacting a vinyl alcohol copolymer with (meth)acrylic acid or a (meth)acrylic acid halide, (meth)acrylic acid anhydride, (meth)acrylic acid ester or other (meth)acrylic acid derivative, with or without a catalyst such as a Brønsted acid, Brønsted base, Lewis acid, Lewis base, metal compound or the like for example. A vinyl alcohol copolymer can also be reacted with a (meth)acrylic derivative such as glycidyl (meth)acrylate or 2-isocyanatoethyl(meth)acrylate having in the molecule functional groups that react with OH groups in the vinyl alcohol copolymer to thereby indirectly introduce (meth)acrylate groups into the vinyl alcohol copolymer.

Thiol Group-Modified Vinyl Alcohol Polymer (B2)

The aforementioned thiol group-modified vinyl alcohol polymer (B2) is a polymer having thiol groups introduced into the molecule by a known method such as a method in which vinyl acetate is copolymerized with a vinyl monomer having an isothiuronium salt or thiolic acid ester, and the resulting polymer is decomposed with an acid or base to obtain thiol groups; a method in which reactive functional groups are introduced into the side chains of a polyvinyl alcohol polymer by a polymer reaction; or a method in which a vinyl ester such as vinyl formate, vinyl acetate, vinyl propionate, vinyl versatate, vinyl laurate, vinyl stearate or the like is polymerized in the presence of a thiolcarboxylic acid such as thiolacetic acid, thiolpropionic acid, thiolbutyric acid or the like (a group which includes organic thiol acids having a —COSH group), and the resulting polymer is saponified to thereby introduce thiol groups only at the ends of the molecules, and normally the thiol group modification rate is in the range of 0.1 to 50 mol %.

Such thiol group-modified vinyl alcohol polymers (B2) are manufactured and sold for example by Kuraray Co., Ltd. as Kuraray M polymers under the trade names M-115 and M-205.

Silyl Group-Modified Vinyl Alcohol Polymer (B3)

Examples of the aforementioned silyl group-modified vinyl alcohol polymer (B3) include polymers having alkoxysilyl groups, acyloxysilyl groups or silanol groups (which are hydrolysates of these) or salts thereof or other silyl groups in the molecule, which are obtained either by a method in which an organohalogen silane such as trimethylchlorosilane, dimethyldichlorosilane, methyltrichlorosilane, vinyltrichlorosilane, diphenyldichlorosilane, an organoacetoxy silane such as trimethylacetoxysilane or dimethylacetoxysilane or an organoalkoxy silane such as trimethoxysilane or dimethyldimethoxysilane or another silylating agent is used to introduce silyl groups by post-modification into a vinyl alcohol polymer or a vinyl acetate polymer containing carboxyl or hydroxyl groups; or a method of saponifying a copolymer of vinyl acetate with a silyl group-containing olefinically unsaturated compound, which may be a vinyl silane such as vinyl trimethoxysilane, vinyl triethoxysilane, vinyl tris-(β-methoxyethoxy)silane, vinyl triacetoxysilane, allyl trimethoxysilane, allyl triacetoxysilane, vinyl methyldimethoxysilane, vinyl dimethylmethoxysilane, vinyl methyldiethoxysilane, vinyl dimethylethoxysilane, vinyl methyldiacetoxysilane, vinyl dimethylacetoxysilane, vinyl isobutyldimethoxysilane, vinyl triisopropoxysilane, vinyl tributoxysilane, vinyl trihexyloxysilane, vinyl methoxydihexoxysilane, vinyl dimethoxyoctyloxysilane or the like, or a (meth)acrylamide-alkyl silane such as 3-(meth)acrylamide-propyltrimethoxysilane, 3-(meth)acrylamide-propyltriethoxysilane, 3-(meth)acrylamide-propyltri(β-methoxyethoxy)silane, 2-(meth)acrylamide-2-methylpropyltrimethoxysilane, 2-(meth)acrylamide-2-methylethyltrimethoxysilane, N-(2-(meth)acrylamide-ethyl)-aminopropyltrimethoxysilane, 3-(meth)acrylamide-propyltriacetoxysilane, 2-(meth)acrylamide-ethyltrimethoxysilane, 1-(meth)acrylamide-methyltrimethoxysilane, 3-(meth)acrylamide-propylmethyldimethoxysilane, 3-(meth)acrylamide-propyldimethylmethoxysilane, 3-(N-methyl-(meth)acrylamide)-propyltrimethoxysilane, 3-((meth)acrylamide-methoxy)-3-hydroxypropyltrimethoxysilane or 3-((meth)acrylamide-methoxy)-propyltrimethoxysilane or the like. The amount of silyl group modification is normally in the range of 0.1 to 50 mol %.

Such silyl group-modified vinyl alcohol polymers (B3) are manufactured and sold by Kuraray Co., Ltd. as Kuraray R polymers under the trade names R-1130, R-2105 and R-2130 for example.

Acetoacetyl Group-Modified Vinyl Alcohol Polymer (B4)

The aforementioned acetoacetyl group-modified vinyl alcohol polymer (B4) is obtained by adding liquid or gaseous Diketene and reacting it with a solution, dispersion or powder of the aforementioned vinyl alcohol polymer, and normally the degree of acetoacetylation is in the range of 1 to 10 mol % or preferably 3 to 5 mol %.

Such acetoacetyl group-modified vinyl alcohol polymers (B4) are manufactured and sold by The Nippon Synthetic Chemical Industry Co., Ltd. under the trade names Gohsefimer Z100, Z200, Z200H and Z210.

Gas Barrier Film

The gas barrier film of the present invention is a gas barrier film consisting of polymer (A) of unsaturated carboxylic acid compound polyvalent metal salt (a), wherein the polymer contains modified vinyl alcohol polymer (B), and preferably contains modified vinyl alcohol polymer (B) in the amount of 50 wt % or less or more preferably 40 to 0.001 wt % or still more preferably 30 to 0.01 wt %.

In the present invention, the gas barrier film is preferably heat treated.

It is desirable to heat treat the film at a temperature range of normally 60 to 350° C. or preferably 100 to 300° C. or still more preferably 150 to 250° C., and preferably in an inactive gas atmosphere. The pressure is not particularly limited, and may be pressurized, reduced pressure or normal pressure. The heat treatment time is normally about 1 second to 90 minutes or preferably 1 minute to 70 minutes or especially 5 minutes to 60 minutes.

The film is normally subjected to heat treatment as is after being coated on the substrate layer, but may as necessary be peeled from the substrate layer before heat treatment.

In the present invention, the film may be continuously heat treated after polymerization, or may be heat treated after having been first cooled to room temperature. It is desirable from the standpoint of production efficiency for the heat treatment step to be performed continuously with the step of forming the film by polymerization.

It is assumed that before heat treatment, the structure of the film has been established by polymerization. It is also believed that the subsequent heat treatment further stabilizes the film by dehydration and partial rearrangement of the film structure, making the gas barrier properties more stable. In this way, it is possible to manufacture a gas barrier film excellent in transparency as well as gas barrier properties.

A gas barrier film consisting of polymer (A) of the present invention is preferably a gas barrier film which gives an infrared absorption spectrum in which the ratio of absorbance $A_0$ near 1700 $cm^{-1}$ attributable the $vC=O$ of the carboxyl acid groups to absorbance A at around 1520 $cm^{-1}$ attributable to the $vC=O$ of the carboxylate ions ($A_0/A$) is less than 0.25 or more preferably less than 0.20 or still more preferably less than 0.15.

Including a modified vinyl alcohol polymer (B) in the gas barrier film of the present invention serves to improve the gas barrier properties under low humidity conditions while contributing to the toughness (elongation) of the film without detracting from the gas barrier properties after hot water treatment (hot water resistance). If the content of modified vinyl alcohol polymer (B) exceeds 50 wt %, the gas barrier properties of the resulting film and in particular the gas barrier properties under high humidity conditions (oxygen barrier properties) will be somewhat reduced. If the content of modified vinyl alcohol polymer (B) is too low, the gas barrier properties under low humidity conditions will not be sufficiently improved.

A gas barrier film consisting of polymer (A) of the present invention has carboxylate ions and free carboxylic acid groups produced, respectively, by ion crosslinking of the carboxylic acid groups and polyvalent metal in unsaturated carboxylic acid compound polyvalent metal salt (a), and absorbance attributable to the $vC=O$ of the free carboxylic acid groups is near 1700 $cm^{-1}$ in the infrared spectrum, while absorbance attributable to the $vC=O$ of the carboxylate ions is near 1520 $cm^{-1}$.

In the gas barrier film of the present invention, a ratio ($A_0/A$) of less than 0.25 means that free carboxylic acid groups are either absent or few, while a level above 0.25 means that the content of free carboxylic acid groups is high, and the gas barrier properties under high humidity conditions are therefore not improved. Therefore, it is desirable that ($A_0/A$) be less than 0.25.

In the present invention, the ratio ($A_0/A$) of absorbance $A_0$ at about 1700 $cm^{-1}$ attributable to the $vC=O$ of the carboxyl acid groups in the infrared absorption spectrum to absorbance A at about 1520 $cm^{-1}$ attributable the $vC=O$ of the carboxylate ions was determined by cutting out a 1 cm×3 cm measurement sample from the gas barrier film, obtaining the infrared absorption spectrum of the surface (polymer (A) layer) by infrared attenuated total reflection (ATR) measurement, and then determining absorbance $A_0$ and absorbance A as follows.

Absorbance $A_0$ at around 1700 $cm^{-1}$ attributable to the $vC=O$ of the carboxyl acid groups: The absorbance values at 1660 $cm^{-1}$ and at 1760 $cm^{-1}$ in the infrared absorption spectrum were connected with a straight line (N), a straight line (O) was drawn vertically down from the maximum absorbance (near 1700 $cm^{-1}$) between 1660 and 1760 $cm^{-1}$, and the distance (length) in absorbance between the maximum absorbance and the intersection of line (O) and line (N) was given as absorbance $A_0$.

Absorbance A at around 1520 $cm^{-1}$ attributable to the $vC=O$ of the carboxylate ions: The absorbance values at 1480 cm$^{-1}$ and at 1630 cm$^{-1}$ in the infrared absorption spectrum were connected with straight line (L), a straight line (M) was drawn vertically down from the maximum absorbance (near 1520 cm$^{-1}$) between 1480 and 1630 cm$^{-1}$, and the distance (length) in absorbance between the maximum absorbance and the intersection of line (M) and line (L) was given as absorbance A. The peak position of the maximum absorbance (near 1520 cm$^{-1}$) varies depending on the metal species of the counter-ions, and is near 1520 cm$^{-1}$ for example in the case of calcium, near 1520 cm$^{-1}$ in the case of zinc and near 1540 cm$^{-1}$ in the case of magnesium.

Next, the ratio ($A_0/A$) is determined from absorbance $A_0$ and absorbance as A determined above.

In the present invention, infrared spectrum measurement (attenuated total reflection measurement: ATR) was performed using a FT-IR350 (manufactured by Nihon Bunko Sha) mounted with a KRS-5 (thallium bromide-iodide) crystal under conditions of incidence angle 45°, room temperature, resolution 4 cm$^{-1}$, times 150.

The thickness of the gas barrier film of the present invention can be determined according to the individual application, but is normally in the range of 0.01 to 100 μm or preferably 0.05 to 50 μm or more preferably 0.1 to 10 μm.

In addition to the aforementioned modified vinyl alcohol polymer (B), the gas barrier film of the present invention may also contain starch, gum arabic, gelatin, polysaccharides and other natural water-soluble polymers, methyl cellulose, ethyl cellulose, carboxymethyl cellulose and other cellulose derivatives, modified starch and other semi-synthetic water-soluble polymers, polyvinyl alcohol, ethylene-vinyl alcohol copolymer and other vinyl alcohol polymers, polyvinylpyrrolidone, polyvinyl ethyl ether, polyacrylamide, polyethyleneimine and other synthetic water-soluble high-molecular-weight acrylic acid ester polymers, ethylene-acrylic acid polymers, and polyvinyl acetate, ethylene-vinyl acetate copolymer, polyester, polyurethane and other high-molecular-weight compounds (polymers) to the extent that these do not detract from the object of the present invention.

The gas barrier film of the present invention may also contain ethylene glycol diacrylate, diethylene glycol diacrylate, triethylene glycol diacrylate, PEG #200 diacrylate, PEG #400 diacrylate, PEG #600 diacrylate and other polyvalent unsaturated carboxylic acid esters, unsaturated carboxylic acid compound monovalent metal salts, methyl (meth)acrylate, ethyl (meth)acrylate and other acrylic acid ester compounds, vinyl acetate and other vinyl ester compounds, ethylene and other olefin compounds and the like, as well as lubricants, slipping agents, anti-blocking agents, anti-static agents, anti-clouding agents, pigments, dyes, inorganic and organic fillers and various other additives to the extent that these do not detract from the object of the present invention, and various surfactants and the like may also be included in order to improve wettability and adhesiveness and the like with the substrate (described below).

Gas Barrier Laminate

The gas barrier laminate of the present invention is obtained by forming a gas barrier film consisting of polymer (A) of unsaturated carboxylic acid compound polyvalent metal salt (a), wherein the polymer also contains the aforementioned modified vinyl alcohol polymer (B), on at least one side of substrate layer (C). By forming (laminating) this polymer (A), a tough laminate is obtained that is transparent, has excellent gas barrier properties (oxygen barrier properties) under high humidity and low humidity conditions, and does not lose its gas barrier properties after hot water treatment (is hot water resistant).

When a gas barrier laminate using film substrate (C1) for substrate layer (C) is used as a packaging material or the like, it offers the advantage of improved heat seal strength.

Another embodiment of the gas barrier laminate of the present invention is a laminate wherein substrate layer (C) (described below) is a substrate layer having inorganic compound deposition layer (D) (described below) formed on at least one side of substrate layer (C), with the aforementioned gas barrier film being formed on at least one side of this inorganic compound deposition layer (D). By using a substrate layer having this inorganic compound deposition layer (D) formed thereon, it is possible to confer moisture resistance on the resulting gas barrier laminate.

Another embodiment of the gas barrier laminate of the present invention is a gas barrier laminate having inorganic compound deposition layer (D) (discussed below) formed on at least one side of the gas barrier film forming the aforementioned gas barrier laminate. B By forming inorganic deposition layer (D) on the gas barrier film, it is possible to confer moisture resistance on the gas barrier laminate.

When laminating the gas barrier film on substrate layer (C), it is also possible to laminate multiple gas barrier films and inorganic compound deposition layers (D), in the order of substrate layer (C)/gas barrier film/inorganic compound deposition layer (D)/gas barrier film/inorganic compound deposition layer (D)/gas barrier film for example. Such a multilayer laminated gas barrier film almost completely blocks oxygen and other gasses or as water vapor the like.

Depending on the form of substrate layer (C) as discussed below and on the intended use, the gas barrier laminate of the present invention may be in a variety of known forms such as a layered film (sheet), hollow container, cup, tray or the like.

The thickness of the gas barrier laminate of the present invention can be selected as necessary according to the object, but the thickness of substrate layer (C) is normally 5 to 1500 μm or preferably 5 to 500 μm or more preferably 9 to 100 μm or still more preferably 9 to 30 μm, while when inorganic compound deposition layer (D) is present its thickness is normally 15 to 5000 Å or preferably 15 to 1000 Å or more preferably 230 to 450 Å, the thickness of the gas barrier film consisting of a layer of polymer (A) is 0.01 to 100 μm or preferably 0.05 to 50 μm or still more preferably 0.1 to 10 μm, and the thickness of the gas barrier laminate as a whole is in the range of 5 to 1600 μm or preferably 5 to 550 μm or more preferably 10 to 150 μm or still more preferably 10 to 40 μm.

Substrate Layer (C)

Substrate layer (C) forming the gas barrier laminate of the present invention normally takes the form of a sheet, film or other film-like body or tray, cup or hollow body or other container consisting of thermosetting resin or thermoplastic resin, or else a film-like body of paper or aluminum foil or the like, or a composite of these. This substrate layer (C) may be a single layer, or may be a multilayer body consisting of layers of the same or different resins.

A variety of known thermosetting resins may be used, including epoxy resin, unsaturated polyester resin, phenol resin, urea-melamine resin, polyurethane resin, silicone resins, polyimide resin and the like.

A variety of known thermoplastic resins may be used, including polyolefins (polyethylene, polypropylene, poly(4-methyl-1-pentene), polybutene, etc.), polyesters (polyethylene terephthalate, polybutylene terephthalate, polyethylene naphthalate, etc.), polyamides (nylon-6, nylon-66, polymetaxylene adipamide, etc.), polyvinyl chloride, polyimide, ethylene-vinyl acetate copolymer or saponificate, polyvinyl alcohol, polyacrylonitrile, polycarbonate, polystyrene, ionomer and mixtures of these and the like. A biodegradable plastic such as polylactic acid or another aliphatic polyester may also be used.

Of these, a thermoplastic resin such as polypropylene, polyethylene terephthalate or polyamide having good drawing properties and transparency is preferred.

When film substrate (C1) is used for substrate layer (C), it may be a uniaxial or biaxial oriented film. A laminate with excellent transparency, heat resistance, rigidity and the like is obtained using a biaxial oriented film substrate for film substrate (C1).

Inorganic compound deposition layer (D) may also be formed on the surface of substrate layer (C).

There are no particular limitations as to what inorganic compounds may be deposited on the surface of substrate layer (C) or the surface of the gas barrier film as long as they are inorganic compounds capable of being deposited, but specific examples include chromium (Cr), zinc (Zn), cobalt (Co), aluminum (Al), tin (Sn), silicon (Si) and other metals or oxides, nitrides, sulfides and phosphides of these metals and the like. Of these inorganic compounds, oxides and particularly aluminum oxide, zinc oxide, silica (silicon oxide) and the like are preferred for their excellent transparency.

Methods of depositing deposition layer (D) of these inorganic compounds on the surface of substrate layer (C) or the surface of the gas barrier film include chemical vapor deposition (CVD), low-pressure CVD, plasma CVD and other chemical deposition methods, vacuum deposition (reactive vacuum deposition), sputtering (reactive sputtering), ion plating (reactive ion plating) and other physical vapor deposition (PVD) methods, and low-pressure plasma spraying, plasma spraying and other plasma spraying methods and the like.

The surface of substrate layer (C) may also be coated with polyvinylidene chloride, polyvinyl alcohol, ethylene-vinyl alcohol copolymer, acrylic resin, urethane resin or the like.

The surface of these substrate layers (C) may also be surface activated by for example corona treatment, flame treatment, plasma treatment, undercoat treatment, primer coat treatment or the like in order to improve adhesiveness with the gas barrier film.

Method for Manufacturing Gas Barrier Film and Gas Barrier Layered Film

The method for manufacturing a gas barrier film and gas barrier layered film of the present invention (hereunder sometimes called "method for manufacturing gas barrier film and the like) is a method for manufacturing a gas barrier laminate by coating at least one side of a substrate with a solution of unsaturated carboxylic acid compound polyvalent metal salt (a) with a degree of polymerization of less than 20, wherein the solution also contains modified vinyl alcohol polymer (B) and preferably contains modified vinyl alcohol polymer (B) in the amount of 50 wt % or less or more preferably 40 to 0.001 wt % or still more preferably 30 to 0.01 wt %, and then polymerizing unsaturated carboxylic acid compound polyvalent metal salt (a) and the like.

In the method for manufacturing gas barrier film and the like of the present invention, a gas barrier laminate of the present invention having a gas barrier film laminated on at least one side thereof is obtained using the aforementioned substrate layer (C) as the substrate. A single-layer gas barrier film of the present invention can also be obtained using either the aforementioned substrate layer (C) or a glass, ceramic, metal or other inorganic substance or other material as the substrate, by peeling from the substrate the polymer (A) obtained by polymerizing unsaturated carboxylic acid compound polyvalent metal salt (a).

Methods of forming a gas barrier film on at least one side of substrate layer (C) or the like include for example a method of preferably first dissolving desired amounts of modified vinyl alcohol polymer (B) and unsaturated carboxylic acid compound polyvalent metal salt (a) with a degree of polymerization of less than 20 in a solvent such as water, and then applying a solution of this mixture, a method of first separately preparing a solution of modified vinyl alcohol polymer (B) and a solution of unsaturated carboxylic acid compound polyvalent metal salt (a) with a degree of polymerization of less than 20, and applying a solution obtained by mixing desired amounts of the solution of modified vinyl alcohol polymer (B) and the solution of unsaturated carboxylic acid compound polyvalent metal salt (a) having a degree of polymerization of less than 20, or a method of applying a solution obtained by mixing desired amounts of modified vinyl alcohol polymer (B) or a solution thereof and a solution wherein unsaturated carboxylic acid compound polyvalent metal salt (a) has been formed by adding the aforementioned polyvalent metal compound to an unsaturated carboxylic acid compound with a degree of polymerization of less than 20, or a solution thereof, but these examples are not limiting, and it is sufficient that a mixture containing modified vinyl alcohol polymer (B) as well as the unsaturated carboxylic acid compound polyvalent metal salt (a) formed from an unsaturated carboxylic acid compound with a degree of polymerization of less than 20 be used in coating the substrate layer.

Various known coating methods, such as a method of applying the solution to substrate layer (C) with a brush or coater or the like, a method of immersing substrate layer (C) in a solution of the mixture, or a method of spraying a solution of the mixture on the surface of substrate layer (C), can be adopted for coating a solution of this mixture on at least one side of substrate layer (C) or the like, depending on the form of substrate layer (C) or the like.

In the method for manufacturing a gas barrier film or the like of the present invention, when the aforementioned unsaturated carboxylic acid compound with a degree of polymerization of less than 20 and the aforementioned polyvalent metal compound are directly dissolved together in a solvent, or in other words when using a solution comprising the unsaturated carboxylic acid compound with a degree of polymerization of less than 20 and the polyvalent metal compound, the polyvalent metal compound is preferably added in an amount exceeding 0.3 chemical equivalents of the unsaturated carboxylic acid compound with a degree of polymerization of less than 20. When using a mixed solution in which the added amount of the polyvalent metal compound is 0.3 chemical equivalents or less, the resulting layered body will contain more free carboxylic acid groups, resulting in a layered body with poor gas barrier properties. There is no particular upper limit on the added amount of the polyvalent metal compound, but since more unreacted polyvalent metal compound remains when the added amount of the polyvalent metal compound exceeds one chemical equivalent, 5 or fewer chemical equivalents or more preferably 2 or fewer chemical equivalents are normally sufficient.

When using a mixed solution of the unsaturated carboxylic acid compound with a degree of polymerization of less than 20 and the polyvalent metal compound, unsaturated carboxylic acid compound polyvalent metal salt (a) normally forms as the unsaturated carboxylic acid compound with a degree of polymerization of less than 20 and the polyvalent metal compound are being dissolved in the solvent, but they should preferably be mixed for at least one minute to ensure formation of the polyvalent metal salt.

The solvent used for the solution of unsaturated carboxylic acid compound polyvalent metal salt (a) with a degree of polymerization of less than 20 and/or for modified vinyl alcohol polymer (B) may be water, a lower alcohol such as methyl alcohol, ethyl alcohol or isopropyl alcohol or an organic solvent such as acetone or methyl ethyl ketone, or a mixed solvent of these, but water is most desirable.

The solution of unsaturated carboxylic acid compound polyvalent metal salt (a) with a degree of polymerization of less than 20, wherein the solution also contains modified vinyl alcohol polymer (B), can be applied to at least one side of substrate layer (C) or the like by a method such as dipping substrate layer (C) or the like in the solution or spraying the solution on the surface of substrate layer (C) or the like, or the solution may be applied using a air knife coater, direct gravure coater, gravure offset, arc gravure coater, gravure reverse, jet nozzle system or other gravure coater, a top feed reverse coater, bottom feed reverse coater, nozzle feed reverse coater or other reverse roll coater, or a 5-roll coater, lip coater, bar coater, bar reverse coater, dye coater or any other known coater in the amount of normally 0.05 to 10 g/m$^2$ or preferably 0.1 to 5 g/m$^2$ as solids in a mixed solution of the unsaturated carboxylic acid compound polyvalent metal salt (a) with a degree of polymerization of less than 20 and the modified vinyl alcohol polymer (B).

As discussed above, when dissolving the unsaturated carboxylic acid compound polyvalent metal salt (a) and/or modified vinyl alcohol polymer (B) or when dissolving the unsaturated carboxylic acid compound and polyvalent metal compound, ethylene glycol diacrylate, diethylene glycol diacrylate, triethylene glycol diacrylate, PEG #200 diacrylate, PEG #400 diacrylate, PEG #600 diacrylate and other polyvalent unsaturated carboxylic acid esters, unsaturated carboxylic acid compound monovalent metal salts, methyl (meth)acrylate, ethyl (meth)acrylate and other acrylic acid ester compounds, vinyl acetate and other vinyl ester compounds, low-molecular-weight compounds or monomers such as ethylene and other olefin compounds and the like, starch, gum arabic, gelatin, polysaccharides and other natural water-soluble polymers, methyl cellulose, ethyl cellulose and carboxymethyl cellulose and other cellulose derivatives, modified starch and other semi-synthetic water-soluble polymers, polyvinyl alcohol, ethylene-vinyl alcohol copolymer and other vinyl alcohol polymers, polyvinylpyrrolidone, polyvinyl ethyl ether, polyacrylamide, polyethyleneimine and other synthetic water-soluble high-molecular-weight acrylic acid ester polymers, ethylene-acrylic acid copolymers, and polyvinyl acetate, ethylene-vinyl acetate copolymer, polyester, polyurethane and other high-molecular-weight compounds (polymers) and the like can be added to the extent that these do not detract from the object of the present invention.

Various additives such as lubricants, slipping agents, anti-blocking agents, anti-static agents, anti-clouding agents, pigments, dyes and inorganic and organic fillers and the like can also be added when dissolving unsaturated carboxylic acid compound polyvalent metal salt (a) and/or modified vinyl alcohol polymer (B) or when dissolving the unsaturated carboxylic acid compound and polyvalent metal compound to the extent that this does not detract from the object of the invention, and various surfactants may also be added improve wettability with the substrate layer.

The solution (coating layer) of unsaturated carboxylic acid compound polyvalent metal salt (a), wherein the solution also contains modified vinyl alcohol polymer (B), which has been formed (coated) on at least one side of substrate layer (C) or the like may be polymerized by a variety of methods, and specific examples include methods using heating, exposure to ionizing radiation and the like.

When using ionizing radiation, the energy rays are not particularly limited as long as the wavelength range is between 0.0001 and 800 nm, but examples include alpha rays, beta rays, gamma rays, X-rays, visible rays, ultraviolet rays, electron rays and the like. Visible rays with a wavelength range of 400 and 800 nm, ultraviolet rays in the range of 50 and 400 nm and electron rays in the range of 0.01 to 0.002 nm are desirable forms of ionizing radiation because they are easy to handle and the equipment is widely available.

In the present invention, the film can be exposed to ionizing radiation immediately after being polymerized, or may be exposed after having been cooled to room temperature. It is generally desirable from the standpoint of manufacturing efficiency that the step of forming the film by polymerization and the heat treatment step be continuous. Membrane performance is improved by repeated exposure to ionizing radiation.

There are no particular limitations on the electron rays (electron beam: EB) to which the solution of the unsaturated carboxylic acid compound polyvalent metal salt is exposed as long as they are strong enough to polymerize the unsaturated carboxylic acid compound polyvalent metal salt, but normally it is desirable to use an electron beam with an accelerating voltage of 30 kV to 300 kV at a dosage of 10 to 300 kiloGrays (kGy). If the accelerating voltage is too large the electron beam will penetrate too deeply, potentially causing deterioration of the substrate layer, while if the accelerating voltage is too small, the electron beam may not penetrate deeply enough, and may not sufficiently polymerize the unsaturated carboxylic acid compound polyvalent metal salt. If the dosage is too large the line acceleration will be slower, detracting from productivity, while if it is too low, the unsaturated carboxylic acid compound polyvalent metal salt may not be sufficiently polymerized.

When using visible rays or ultraviolet as the ionizing radiation, a photopolymerization initiator must be added to the solution of unsaturated carboxylic acid compound polyvalent metal salt (a), which also contains modified vinyl alcohol polymer (B). A known polymerization initiator may be used, and examples include 2-hydroxy-2-methyl-1-phenyl-propane-1-one (Darocure 1173®, Ciba Specialty Chemicals), 1-hydroxycyclohexyl-phenylketone (Irgacure 184®, Ciba Specialty Chemicals), bis(2,4,6-trimethylbenzoyl)-phenylphosphineoxide (Irgacure 819®, Ciba Specialty Chemicals), 1-[4-(2-hydroxyethoxy)-phenyl]-2-hydroxy-2-methyl-1-propane-1-one (Irgacure 2959®, Ciba Specialty Chemicals), a mixture of α-hydroxyketone, acylphosphine oxide, 4-methylbenzophenone and 2,4,6-trimethylbenzophenone (Esacure KT046®, Lamberti Chemical Specialty), Esacure KT55 (Lamberti Chemical Specialty), 2,4,6-trimethylbenzoyl diphenylphosphine oxide (Speedcure TPO®, Lambson Fine Chemicals), and radical polymerization initiators manufactured and sold under other trademarks. A polymerization accelerator may also be added to increase the degree or speed of polymerization, and examples include N,N-dimethylamino-ethyl-(meth)acrylate, N-(meth)acryloyl-morpholine and the like.

The solution should preferably be exposed multiple times to the ionizing radiation in order to promote polymerization. For example, it should preferably be exposed multiple times, such as twice for example, to ultraviolet with a wavelength range of 280 to 320 nm at an intensity of 200 mW/cm$^2$ using an electrodeless or electrode-type ultraviolet lamp.

Unsaturated carboxylic acid compound polyvalent metal salt (a) which also contains modified vinyl alcohol polymer (B) may be polymerized in a solution containing water or another solvent, or may be polymerized after partial drying, but if the solution is polymerized immediately after being coated the resulting polymer (A) layer may turn white, possibly because more solvent evaporates as metal salt (a) is polymerized. If there is too little solvent (moisture), however, unsaturated carboxylic acid compound polyvalent metal salt (a) may crystallize and precipitate, and if it is polymerized in this state the polymer (A) layer may not form properly, or else the polymer (A) layer may turn white and the gas barrier properties may not be stable. Therefore, the applied unsaturated carboxylic acid compound polyvalent metal salt (a) is preferably polymerized in a state containing a suitable amount of moisture.

Unsaturated carboxylic acid compound polyvalent metal salt (a) which also contains modified vinyl alcohol polymer (B) may also be polymerized by exposing it once to ionizing radiation, or by exposing it two or more times, or by continuous exposure. In the case of two or more exposures, the first exposure may be weaker and the second and subsequent exposures stronger, or the exposure strength may be the same or may be varied continuously.

If the gas barrier laminate of the present invention is a layered film, a layered film (multilayer film) suitable as a heat-sealable packaging film can be obtained by laminating (affixing) a heat-sealable layer to at least one side thereof.

Examples of such heat-sealable layers include layers obtained from ethylene, propylene, butene-1, hexene-1,4-methyl pentene-1, octane-1 and other alpha-olefins either as homopolymers or as copolymers, high-pressure method low-density polyethylene, linear low-density polyethylene (LLDPE), high-density polyethylene, polypropylene, polypropylene random copolymers, polybutene, poly-4-methyl pentene-1, low-crystalline or amorphous ethylene-propylene random copolymer, ethylene-butene-1 random copolymer propylene-butene-1 random copolymer, and other polyolefins either alone or as compositions of two or more, ethylene-vinyl acetate copolymer (EVA), ethylene-(meth)acrylic acid copolymer and metal salt thereofs, and compositions of EVA and polyolefins, which are commonly used in heat-sealable layers.

Of these, a heat-sealable layer obtained from high-pressure method low-density polyethylene, linear low-density polyethylene (LLDPE), high-density polyethylene or another ethylene polymer is desirable for its superior low-temperature heat-sealability and heat-seal strength.

Depending on the intended purpose, the aforementioned substrate layer (C) may also be laminated on the gas barrier film surface of the gas barrier laminate or on the other surface without the gas barrier film in the gas barrier laminate of the present invention.

EXAMPLES

Next, the present invention is explained in more detail by means of examples, but the present invention is not in any way limited by these examples.

The physical values in the examples and comparative examples were obtained by the following evaluation methods.

(Evaluation Methods)
(1) Polymerization rate (%): The polymerization rate (%) of the unsaturated carboxylic acid compound polyvalent metal salt in the present invention was measured as follows.

$$\text{Polymerization (\%)} = [1 - (B_1/B)_{post\ uv}/(B_1/B)_{monomer}] \times 100$$

$(B_1/B)_{post\ uv}$: $(B_1/B)$ after ultraviolet exposure (polymer)
$(B_1/B)_{monomer}$: $(B_1/B)$ of monomer (before polymerization)
Monomer: unsaturated carboxylic acid compound polyvalent metal salt (a)
$(B_1/B)$ is as defined below.

The ratio $(B_1/B)$ of absorbance $B_1$ around 830 cm$^{-1}$ attributable to the $\delta$C—H of hydrogen binding to vinyl groups to absorbance B near 1520 cm$^{-1}$ attributable to the $\nu$C=O of carboxylate ions in the infrared spectrum was determined by cutting out a 1 cm×3 cm measurement sample from the polymerized film, obtaining the infrared absorption spectrum of the surface (polymer (A) layer surface) by attenuated total reflection (ATR) measurement, and then determining absorbance $B_1$ and absorbance B as follows.

Absorbance $B_1$ around 830 cm$^{-1}$ attributable to $\delta$C—H of hydrogen binding to vinyl groups: The absorbance values at 800 cm$^{-1}$ and at 850 cm$^{-1}$ in the infrared absorption spectrum were connected with a straight line (P), a straight line (Q) was drawn vertically down from the maximum absorbance (near 830 cm$^{-1}$) between 800 and 850 cm$^{-1}$, and the distance (length) in absorbance between the maximum absorbance and the intersection of line (Q) and line (P) is given as absorbance $B_1$.

Absorbance B at around 1520 cm$^{-1}$ attributable to the $\nu$C=O of the carboxylate ions: The absorbance values at 1480 cm$^{-1}$ and at 1630 cm$^{-1}$ in the infrared absorption spectrum were connected with straight line (L), a straight line (M) was drawn vertically down from the maximum absorbance (near 1520 cm$^{-1}$) between 1480 and 1630 cm$^{-1}$, and the distance (length) in absorbance between the maximum absorbance and the intersection of line (M) and line (L) was given as absorbance B. The peak position of the maximum absorbance (near 1520 cm$^{-1}$) varies depending on the metal species of the counter-ions, and is near 1520 cm$^{-1}$ for example in the case of calcium, near 1520 cm$^{-1}$ in the case of zinc and near 1540 cm$^{-1}$ in the case of magnesium.

Next, the ratio $(B_1/B)$ is determined from absorbance $B_1$ and absorbance B as determined above. The polymerization rate is determined according to the aforementioned formula by measuring the absorbance ratio $(B_1/B)_{monomer}$ of the unsaturated carboxylic acid compound polyvalent metal salt (a) (monomer) and the $(B_1/B)_{post\ uv}$ of polymer (A) after UV exposure.

In the present invention, infrared spectrum measurement (attenuated total reflection: ATR) was performed using a using FT-IR350 (manufactured by Nihon Bubko Sha) mounted with a KRS-5 (thallium bromide-iodide) crystal under conditions of incidence angle 45°, room temperature, resolution 4 cm$^{-1}$, times 150.

(2) The absorbance ratio ($A_0/A$) was measured by the methods described previously.

(3) Oxygen permeability [ml/(m$^2$-day-MPa)]: A gas barrier layered film or a multilayer film having linear low-density polyethylene film affixed thereto as described below was measured after 3 hours of adjustment to conditions of 20° C., 90% RH using a Mocon Ox-Tran 2/21 ML in accordance with JIS K7126 (equal pressure method). It was also measured after 3 hours of adjustment under conditions of 20° C., 0% RH using a Mocon Ox-Tran 2/20 SM in accordance with JIS K7126 (equal pressure method).

(4) Preparation of multilayer films: A urethane adhesive [12 pts wt polyurethane adhesive (Mitsui Takeda Chemicals, trade name Takelac A310), 1 pt wt isocyanate curing agent (Mitsui Takeda Chemicals, trade name Takenate A3), 7 pts wt ethyl acetate (Kanto Chemical)] was coated and dried on one side of a 50 μm-thick linear low-density polyethylene film (Tohcello, trade name T.U.X. FCS), and the Zn acrylate salt polymer layers (unsaturated carboxylic acid compound polyvalent metal salt layers) of the gas barrier films obtained in the examples and comparative examples were affixed thereto (dry laminated) to obtain multilayer films.

(5) Boiling: The multilayer films obtained by the aforementioned methods were treated for 30 minutes in hot water at 95° C.

(6) Heat-seal strength (HS strength: N/15 mm): the linear low-density polyethylene film surfaces of the multilayer films obtained by the aforementioned methods were heat sealed together at 130° C. for 1 second at 2 kg/cm², and 15 mm-wide samples were taken and measured for heat-seal strength at a rate of 300 mm/minute using a tensile tester (Orientec, Inc. Tensilon Universal Tester RTC-1225) under conditions of 23° C., 50% RH.

(7) Moisture content (wt %) of coating liquid (coated film): A 120×297 mm measurement sample was cut out of a gas barrier layered film obtained by applying a solution of an unsaturated carboxylic acid compound polyvalent metal salt, weighed (Wg), and then weighed again after having been dried for 10 minutes in a hot-air dryer at 130° C. (dry Wg). A separate 120×297 mm measurement sample was also cut out of the base film (film for coating unsaturated carboxylic acid compound polyvalent metal salt solution), and weighed (base Wg). The moisture content of the coated film was then determined from the weights of the films by the following formula:

Moisture content (wt %)=[{(W–base W)–(dry W–base W)}/(W–base W)]×100.

(Preparation of Solution (X))

A zinc acrylate (Zn salt of acrylic acid) aqueous solution (Asada Chemical, concentration 30 wt % (20 wt % acrylic acid, 10 wt % Zn)), the photopolymerization initiator 1-[4-(2-hydroxyethoxy)-phenyl]-2-hydroxy-2-methyl-1-propane-1-one (Irgacure 2959®, Ciba Specialty Chemicals) diluted to 25 wt % with methyl alcohol, and a surfactant (Kao Corp., trade name Emulgen 120) were mixed to molar percentages of 98.5%, 1.2% and 0.3%. respectively to prepare Zn acrylate salt solution (X).

(Modified Vinyl Alcohol Polymer (B); Modified PVA) (Acrylate Group-Modified Vinyl Alcohol Polymer (B1))

(1) 19% acrylated polyvinyl alcohol (B1-1)

10.0 g (0.23 mol) of polyvinyl alcohol-1 (PVA500®, Wako Pure Chemical, degree of polymerization 500, degree of saponification 98.5 mol %) was placed in a 500 mL round-bottomed three-neck flask, and nitrogen was substituted inside the flask. 300 mL of 1-methyl-2-pyrrolidinone (hereunder called NMP) was added to the flask. This was heated to 100° C., and agitated for 2 hours to obtain a uniform solution. This uniform solution was cooled to 25° C., and 10.2 g (0.113 mol) of acryloyl chloride was dripped in and reacted. After 90 minutes, the reaction mixture was dripped into 1800 mL of tetrahydrofuran (hereunder called THF) to precipitate acrylated polyvinyl alcohol. The supernatant was removed by decantation, and the resulting precipitate was dissolved in 100 mL of water/methanol (1/1 vol). The resulting solution was dripped into 800 mL of THF to precipitate acrylated polyvinyl alcohol.

The supernatant was removed by decantation. This re-precipitation operation was repeated twice more to purify the acrylated polyvinyl alcohol. When part of the purified acrylated polyvinyl alcohol (about 50 mg) was dissolved in 1 mL of dimethyl sulfoxide deuteride (hereunder called DMSO-$d_6$) and subjected to $^1$H-NMR measurement, the acryloyl group substitution rate was found to be 19 mol %. The purified acrylated polyvinyl alcohol was then dissolved in 100 mL of water/methanol (1/1 vol) to obtain a 19% acrylated polyvinyl alcohol (B1-1) solution with a solids concentration of 8.9 wt %.

(2) 14% acrylated polyvinyl alcohol (B1-2)

The same reactions and post-processing were performed as in preparing B1-1 except that water (100 mL) was substituted for water/methanol (1/1 vol) as the good solvent in the re-precipitation operation with a reaction time of 45 minutes. The acryloyl group substitution rate was 14 mol %. The purified acrylated polyvinyl alcohol was then dissolved in 100 mL of water to obtain an aqueous solution of 14% acrylated polyvinyl alcohol (B1-2) with a solids concentration of 9.5 wt %.

(3) 11% acrylated polyvinyl alcohol (B1-3)

The same reactions and post-processing were performed as in preparing B1-1 except using 12.0 g (0.27 mol) of polyvinyl alcohol-1 and 5.2 g (57.5 mmol) of acryloyl chloride with a reaction time of 28 hours and with water (100 mL) substituted for the good solvent in the re-precipitation operation. The acryloyl group substitution rate was 11 mol %. The purified acrylated polyvinyl alcohol was then dissolved in 100 mL of water to obtain an aqueous solution of 11% acrylated polyvinyl alcohol (B1-3) with a solids concentration of 9.0 wt %.

(4) 7.9% acrylated polyvinyl alcohol (B1-4)

The same reactions and post-processing were performed as in preparing B1-1 except using 12.0 g (0.27 mol) of polyvinyl alcohol-1 and 4.2 g (46.4 mmol) of acryloyl chloride with a reaction time of 7 hours and with water (100 mL) substituted for the good solvent in the re-precipitation operation. The acryloyl group substitution rate was 7.9 mol %. The purified acrylated polyvinyl alcohol was then dissolved in 100 mL of water to obtain an aqueous solution of 7.9% acrylated polyvinyl alcohol (B1-4) with a solids concentration of 8.9 wt %.

(5) 3.4% acrylated polyvinyl alcohol (B1-5)

The same reactions and post-processing were performed as in preparing B1-1 except using 12.0 g (0.27 mol) of polyvinyl alcohol-1 and 2.45 g (27.1 mmol) of acryloyl chloride with a reaction time of 18 hours and with water (100 mL) substituted for the good solvent in the re-precipitation operation. The acryloyl group substitution rate was 3.4 mol %. The purified acrylated polyvinyl alcohol was then dissolved in 100 mL of water to obtain an aqueous solution of 3.4% acrylated polyvinyl alcohol (B1-5) with a solids concentration of 10.7 wt %.

(6) 7.5% acrylated polyvinyl alcohol (B1-6)

The same reactions and post-processing were performed as in preparing B1-1 except using 12.0 g (0.27 mol) of polyvinyl alcohol-2 (degree of polymerization 1000, degree of saponification 98.5%, Kuraray Co. PVA110®) and 4.98 g (55.0 mmol) of acryloyl chloride, with a reaction time of 21 hours and with water (100 mL) substituted for the good solvent in the re-precipitation operation and the amount of the weak solvent (THF) in the re-precipitation operation changed to 1750 mL. The acryloyl group substitution rate was 7.5 mol %. The purified acrylated polyvinyl alcohol was then dissolved in 100 mL of water to obtain an aqueous solution of 7.5% acrylated polyvinyl alcohol (B1-6) with a solids concentration of 8.4 wt %.

(7) 3.5% acrylated polyvinyl alcohol (B1-7)

12.0 g (0.27 mol) of polyvinyl alcohol-3 (degree of polymerization 1700, degree of saponification 98.5%, Kuraray Co. PVA117®) was placed in a 500 mL round-bottomed three-neck flask, and nitrogen was substituted inside the flask. NMP (300 mL) was added to the flask. This was heated to 120° C., and agitated for 1 hour to obtain a uniform solution. This uniform solution was cooled to 25° C., and 3.52 g (38.9 mmol) of acryloyl chloride was dripped into the flask and reacted. After 18 hours, the reaction mixture was dripped into 1600 mL of THF/isopropanol (hereunder called IPA) (1/1 vol) to precipitate acrylated polyvinyl alcohol. The supernatant was removed by decantation, and the resulting precipitate was dissolved in 150 mL of water. The resulting solution was dripped into 1200 mL of IPA to precipitate acrylated polyvinyl alcohol. The supernatant was removed by decantation. This re-precipitation operation was repeated twice more to purify the acrylated polyvinyl alcohol. When part of the purified acrylated polyvinyl alcohol (about 50 mg) was dissolved in 1 mL of DMSO-$d_6$ and subjected to $^1$H-NMR measurement, the acryloyl group substitution rate was found to be 3.5 mol %. The purified acrylated polyvinyl alcohol was then dissolved in 150 mL of water to obtain a 3.5% acrylated polyvinyl alcohol (B1-7) with a solids concentration of 4.8 wt %. (Thiol group-modified polyvinyl alcohol polymer (B2))
(8) Thiol group-modified polyvinyl alcohol: degree of polymerization 1500, degree of saponification 97.5%, Kuraray Co. M-115® (B2-1)
(Silyl Group-Modified Vinyl Alcohol Polymer (B3))
(9) Silyl group-modified vinyl alcohol polymer: degree of polymerization 1700, degree of saponification 98.5%, Kuraray Co. R-1130® (B3-1)
(Acetoacetyl Group-Modified Vinyl Alcohol Polymer (B4))
(10) Acetoacetyl group-modified polyvinyl alcohol: degree of polymerization 1200, saponification 99.5%, The Nippon Synthetic Chemical Industry Co., Ltd., Z-200® (B4-1)

10 wt % aqueous solutions of the modified vinyl alcohol polymers were prepared ahead of time when preparing coating solutions using these modified vinyl alcohol polymers.
(Vinyl Alcohol Polymer (C): PVA)
(11) Polyvinyl alcohol: degree of polymerization 500, saponification 98.5%, Wako Pure Chemical, PVA500® (C)

Examples 1 and 2

Acrylic acid Zn salt solution (X) and a 19% acrylated polyvinyl alcohol (B1-1) aqueous solution were mixed in the weight ratios of zinc acrylate and acrylated polyvinyl alcohol (B1-1) (as solids) described in Table 1, and this solution was adjusted to a 16 wt % solids concentration to prepare a coating solution. The coating solution was then applied to 1.6 g/m$^2$ (as solids) with a Meyer bar on the corona treated surface of a substrate film consisting of 12 μm-thick biaxially oriented polyester film (Unitika Co., Emblet PET12®), and dried with a hot-air dryer. This was then immediately fixed on a stainless steel plate with the coated surface up, and polymerized by exposure to ultraviolet rays under conditions of UV strength 180 mW/cm$^2$, cumulative light 180 mJ/cm$^2$ using a UV irradiator (Eye Graphics Eye Grandage type ECS 301G1) to obtain a gas barrier layered film. The resulting gas barrier layered film was evaluated by the methods described above.

As evaluated by these methods, the water content of the coated film immediately before UV exposure in Example 1 was 43 wt %.

Examples 3 to 5

Gas barrier layered films were obtained as in Example 1 except that 14% acrylated polyvinyl alcohol (B1-2) was used in place of the 19% acrylated polyvinyl alcohol (B1-1) used in Example 1, and mixed in the weight ratios described in Table 1. The resulting gas barrier layered films were evaluated by the methods described above.
The evaluation results are shown in Table 1.

Examples 6 to 8

Gas barrier layered films were obtained as in Example 1 except that 11% acrylated polyvinyl alcohol (B1-3) was used in place of the 19% acrylated polyvinyl alcohol (B1-1) used in Example 1, and mixed in the weight ratios described in Table 1. The resulting gas barrier layered films were evaluated by the methods described above.
The evaluation results are shown in Table 1.

Examples 9 to 11

Gas barrier layered films were obtained as in Example 1 except that 7.9% acrylated polyvinyl alcohol (B1-4) was used in place of the 19% acrylated polyvinyl alcohol (B1-1) used in Example 1, and mixed in the weight ratios described in Table 1. The resulting gas barrier layered films were evaluated by the methods described above.
The evaluation results are shown in Table 1.

Examples 12 and 13

Gas barrier layered films were obtained as in Example 1 except that 3.4% acrylated polyvinyl alcohol (B1-6) was used in place of the 19% acrylated polyvinyl alcohol (B1-1) used in Example 1, and mixed in the weight ratios described in Table 1. The resulting gas barrier layered films were evaluated by the methods described above.
The evaluation results are shown in Table 1.

Example 14

A gas barrier layered film was obtained as in Example 1 except that 7.5% acrylated polyvinyl alcohol (B1-6) was used in place of the 19% acrylated polyvinyl alcohol (B1-1) used in Example 1, and mixed in the weight ratio described in Table 1. The resulting gas barrier layered film was evaluated by the methods described above.
The evaluation results are shown in Table 1.

Example 15

A gas barrier layered film was obtained as in Example 1 except that 3.5% acrylated polyvinyl alcohol (B1-7) was used in place of the 19% acrylated polyvinyl alcohol (B1-1) used in Example 1, and mixed in the weight ratio described in Table 1. The resulting gas barrier layered film was evaluated by the methods described above.
The evaluation results are shown in Table 1.

Example 16

A gas barrier layered film was obtained as in Example 1 except that thiol group-modified polyvinyl alcohol (B2-1) was used in place of the 19% acrylated polyvinyl alcohol (B1-1) used in Example 1, and mixed in the weight ratio described in Table 1. The resulting gas barrier layered film was evaluated by the methods described above.
The evaluation results are shown in Table 1.

Examples 17 and 18

Gas barrier layered films were obtained as in Example 1 except that silyl group-modified vinyl alcohol (B3-1) was used in place of the 19% acrylated polyvinyl alcohol (B1-1) used in Example 1, and mixed in the weight ratios described in Table 1. The resulting gas barrier layered films were evaluated by the methods described above.
The evaluation results are shown in Table 1.

Examples 19 to 21

Gas barrier layered films were obtained as in Example 1 except that acetoacetyl group-modified polyvinyl alcohol (B4-1) was used in place of the 19% acrylated polyvinyl alcohol (B1-1) used in Example 1, and mixed in the weight ratios described in Table 1. The resulting gas barrier layered films were evaluated by the methods described above.

The evaluation results are shown in Table 1.

Reference Example 1

A gas barrier layered film was obtained as in Example 1 except that a coating solution obtained by adjusting the solids concentration of acrylic acid Zn salt solution (X) to 16 wt % with water was used in place of the coating solution used in Example 1. The resulting gas barrier layered film was evaluated by the methods described above.

The evaluation results are shown in Table 1.

Reference Examples 2 and 3

Gas barrier layered films were obtained as in Example 1 except that vinyl alcohol polymer (C) was used in place of the 19% acrylated polyvinyl alcohol (B1-1) used in Example 1, and mixed in the weight ratios described in Table 1. The resulting gas barrier layered films were evaluated by the methods described above.

The evaluation results are shown in Table 1.

Example 23

A gas barrier layered film was obtained as in Example 5 except that the 12 μm-thick biaxially oriented polyester film (Unitika Co., Emblet PET12®) used as the base film in Example 5 was replaced with a 20 μm-thick biaxially oriented polypropylene film (OPP: Tohcello, OP HE-1®). Linear low-density polyethylene film was then affixed to the resulting gas barrier layered film by the methods described above to obtain a multilayer film. The multilayer film was evaluated by the methods described above.

The evaluation results are shown in Table 2.

Example 24

A gas barrier layered film was obtained as in Example 5 except that the 12 μm-thick biaxially oriented polyester film (Unitika Co., Emblet PET12®) used as the base film in Example 5 was replaced with a 15 μm-thick biaxially oriented polyamide film (ONY: Unitika Co., Emblet ON15®). Linear low-density polyethylene film was then affixed to the resulting gas barrier layered film by the methods described above to obtain a multilayer film. The resulting multilayer film was evaluated by the methods described above.

The evaluation results are shown in Table 2.

TABLE 1

| | Modified PVA (B) etc. | Solids weight % Zinc acrylate | Solids weight % Mod. PVA etc. | Polymerization rate % | Absorbance ratio $A/A_0$ | Oxygen permeation [ml/m² · day · MPa] 0% RH | Oxygen permeation [ml/m² · day · MPa] 90% RH | Oxygen permeation [ml/m² · day · MPa] 90% RH after boiling | HS strength N/15 mm |
|---|---|---|---|---|---|---|---|---|---|
| Example 1 | B1-1 | 91.7 | 8.3 | 89.3 | 0.08 | 62.0 | 0.6 | 5.5 | 28.4 |
| Example 2 | | 87.5 | 12.5 | 90.0 | 0.09 | 20.0 | 0.8 | 3.0 | 31.3 |
| Example 3 | B1-2 | 91.7 | 8.3 | 91.7 | 0.04 | 19.0 | 0.9 | 1.4 | 32.7 |
| Example 4 | | 87.5 | 12.5 | 89.0 | 0.06 | 14.0 | 2.9 | 17.8 | 23.8 |
| Example 5 | | 75.0 | 25.0 | 84.6 | 0.04 | 7.0 | 7.7 | 28.8 | 35.8 |
| Example 6 | B1-3 | 91.7 | 8.3 | 90.2 | 0.03 | 40.0 | 7.4 | 6.5 | 27.7 |
| Example 7 | | 87.5 | 12.5 | 94.9 | 0.07 | 26.0 | 3.0 | 8.6 | 28.9 |
| Example 8 | | 75.0 | 25.0 | 94.3 | 0.12 | 23.0 | 15.0 | 18.9 | 28.8 |
| Example 9 | B1-4 | 91.7 | 8.3 | 95.7 | 0.09 | 27.0 | 5.6 | 3.5 | 31.5 |
| Example 10 | | 87.5 | 12.5 | 95.7 | 0.05 | 51.0 | 8.5 | 4.1 | 20.3 |
| Example 11 | | 75.0 | 25.0 | 89.4 | 0.06 | 32.0 | 16.3 | 41.0 | 21.6 |
| Example 12 | B1-5 | 91.7 | 8.3 | 92.4 | 0.08 | 14.0 | 4.3 | 6.9 | 28.6 |
| Example 13 | | 87.5 | 12.5 | 95.5 | 0.05 | 22.0 | 7.1 | 7.7 | 23.4 |
| Example 14 | B1-6 | 87.5 | 12.5 | 92.6 | 0.07 | 16.8 | 0.8 | 2.1 | 29.9 |
| Example 15 | B1-7 | 87.5 | 12.5 | 89.2 | 0.09 | 5.0 | 5.2 | 2.3 | 33.3 |
| Example 16 | B2-1 | 87.5 | 12.5 | 92.4 | 0.04 | 28.0 | 3.1 | 53.3 | 22.6 |
| Example 17 | B3-1 | 87.5 | 12.5 | 94.1 | 0.07 | 15.0 | 1.8 | 30.0 | 21.4 |
| Example 18 | | 75.0 | 25.0 | 96.0 | 0.06 | 2.0 | 4.8 | 44.1 | 39.6 |
| Example 19 | B4-1 | 91.7 | 8.3 | 81.6 | 0.04 | 90.0 | 9.4 | 56.5 | 19.3 |
| Example 20 | | 87.5 | 12.5 | 93.1 | 0.03 | 62.0 | 40.2 | 36.7 | 25.4 |
| Example 21 | | 75.0 | 25.0 | 95.8 | 0.07 | 5.0 | 5.1 | 46.1 | 46.3 |
| Ref. Ex. 1 | — | 100 | 0 | 92.4 | 0.07 | 79.0 | 1.1 | 2.0 | 21.5 |
| Re. Ex. 2 | PVA500 | 87.5 | 12.5 | 92.0 | 0.04 | 24.0 | 0.4 | Delamination | 19.5 |
| Re. Ex. 3 | | 75.0 | 25.0 | 88.9 | 0.08 | 14.0 | 62.5 | Delamination | 19.9 |

Example 22

A gas barrier layered film was obtained as in Example 5 except that the 12 μm-thick biaxially oriented polyester film (Unitika Co., Emblet PET12®) used as the base film in Example 5 was replaced with a 12 μm-thick aluminum oxide-deposited biaxially oriented polyethylene terephthalate film (deposited PET: Tohcello, TL-PET H®). Linear low-density polyethylene film was then affixed to the resulting gas barrier layered film by the methods described above to obtain a multilayer film. The resulting multilayer film was evaluated by the methods described above.

The evaluation results are shown in Table 2.

Example 25

A gas barrier layered film was obtained as in Example 16 except that the 12 μm-thick biaxially oriented polyester film (Unitika Co., Emblet PET 12®) used as the base film in Example 18 was replaced with a 12 μm-thick aluminum oxide-deposited biaxially oriented polyethylene terephthalate film (deposited PET: Tohcello, TL-PET H®). Linear low-density polyethylene film was then affixed to the resulting gas barrier layered film by the methods described above to obtain a multilayer film. The resulting multilayer film was evaluated by the methods described above.

The evaluation results are shown in Table 2.

Example 26

A gas barrier layered film was obtained as in Example 19 except that the 12 μm-thick biaxially oriented polyester film (Unitika Co., Emblet PET 12®) used as the base film in Example 19 was replaced with a 12 μm-thick aluminum oxide-deposited biaxially oriented polyethylene terephthalate film (deposited PET: Tohcello, TL-PET H®). Linear low-density polyethylene film was then affixed to the resulting gas barrier layered film by the methods described above to obtain a multilayer film. The resulting multilayer film was evaluated by the methods described above.

The evaluation results are shown in Table 2.

Reference Example 4

A gas barrier layered film was obtained as in Reference Example 1 except that the 12 μm-thick biaxially oriented polyester film (Unitika Co., Emblet PET 12®) used as the base film in Reference Example 1 was replaced with a 12 μm-thick aluminum oxide-deposited biaxially oriented polyethylene terephthalate film (deposited PET: Tohcello, TL-PET H®). Linear low-density polyethylene film was then affixed to the resulting gas barrier layered film by the methods described above to obtain a multilayer film. The resulting multilayer film was evaluated by the methods described above.

The evaluation results are shown in Table 2.

Reference Example 5

A gas barrier layered film was obtained as in Reference Example 3 except that the 12 μm-thick biaxially oriented polyester film (Unitika Co., Emblet PET 12®) used as the base film in Reference Example 3 was replaced with a 12 μm-thick aluminum oxide-deposited biaxially oriented polyethylene terephthalate film (deposited PET: Tohcello, TL-PET H®). Linear low-density polyethylene film was then affixed to the resulting gas barrier layered film by the methods described above to obtain a multilayer film. The resulting multilayer film was evaluated by the methods described above.

The evaluation results are shown in Table 2.

Examples of heat treatment are given below. Permeation (water vapor permeation) was determined by the following methods.

Water vapor permeation [g/(m²/day)]: A multilayer film was folded, two sides were heat-sealed (on the linear low-density polyethylene film surface) to form a bag, this was filled with calcium chloride and sealed on the other side to prepare a bag with a surface area of 0.01 m² which was then left for 3 days at 40° C., 90% RH, and Water vapor permeation was measured based on the weight difference.

(Preparation of Solution (X))

A zinc acrylate (Zn salt of acrylic acid) aqueous solution (Asada Chemical, concentration 30 wt % (20 wt % acrylic acid, 10 wt % Zn)), the photopolymerization initiator 1-[4-(2-hydroxyethoxy)-phenyl]-2-hydroxy-2-methyl-1-propane-1-one (Irgacure 2959®, Ciba Specialty Chemicals) diluted to 25 wt % with methyl alcohol, and a surfactant (Kao Corp., Emulgen 120®) were mixed to molar percentages of 98.5%, 1.2% and 0.3%. respectively to prepare an unsaturated carboxylic acid compound polyvalent metal salt solution consisting of Zn acrylate salt solution (X).

Example 27

A gas barrier layered film was obtained as in Example 13 except that the 12 μm-thick biaxially oriented polyester film (Unitika Co., Emblet PET 12®) used as the base film in Example 13 was replaced with a 12 μm-thick aluminum oxide-deposited biaxially oriented polyethylene terephthalate film (deposited PET: Tohcello, TL-PET H®). Linear low-density polyethylene film was then affixed to the resulting gas barrier layered film by the methods described above to obtain a multilayer film. The resulting multilayer film was evaluated by the methods described above.

The evaluation results are shown in Table 3.

Example 28

A gas barrier layered film was obtained as in Example 13 except that the 12 μm-thick biaxially oriented polyester film (Unitika Co., Emblet PET 12®) used as the base film in Example 17 was replaced with a 12 μm-thick aluminum oxide-deposited biaxially oriented polyethylene terephthalate film (deposited PET: Tohcello, trade name TL-PET H). Linear low-density polyethylene film was then affixed to the resulting gas barrier layered film by the methods described above to obtain a multilayer film. The resulting multilayer film was evaluated by the methods described above.

The evaluation results are shown in Table 3.

TABLE 2

| | Modified PVA (B) etc. | Substrate film | Solids weight % | | Polymerization rate % | Absorbance ratio $A/A_0$ | Oxygen permeation [ml/m² · day · MPa] | | |
|---|---|---|---|---|---|---|---|---|---|
| | | | Zinc acrylate | Mod. PVA etc. | | | 0% RH | 90% RH | 90% RH after boiling |
| Example 22 | B1-2 | Deposited PET | 75.0 | 25.0 | 88.3 | 0.04 | 0.5 | 0.3 | 0.5 |
| Example 23 | | OPP | 75.0 | 25.0 | 90.1 | 0.05 | 7.1 | 7.5 | 32.1 |
| Example 24 | | ONY | 75.0 | 25.0 | 92.3 | 0.08 | 7.3 | 8.1 | 30.1 |
| Example 25 | B3-1 | Dep. PET | 75.0 | 25.0 | 95.5 | 0.04 | 0.0 | 0.0 | 19.8 |
| Example 26 | B4-1 | Dep. PET | 75.0 | 25.0 | 88.1 | 0.02 | 0.0 | 0.3 | 2.4 |
| Ref. Ex. 4 | — | Dep. PET | 100 | 0 | 92.1 | 0.08 | 4.5 | 0.1 | 2.6 |
| Ref. Ex. 5 | PVA500 | Dep. PET | 75.0 | 25.0 | 91.8 | 0.07 | 1.5 | 0.0 | Delamination |

Example 29

A heat-treated gas barrier layered film was obtained by heat treating the gas barrier layered film obtained in Example 27 for 10 minutes at 120° C. Linear low-density polyethylene film was then affixed to the resulting heat-treated gas barrier layered film to obtain a multilayer film. The resulting multilayer film was evaluated by the methods described above.

The evaluation results are shown in Table 3.

Example 30

A heat-treated gas barrier layered film was obtained by heat treating the gas barrier layered film obtained in Example 27 for 10 minutes at 150° C. Linear low-density polyethylene film was then affixed to the resulting heat-treated gas barrier layered film to obtain a multilayer film. The resulting multilayer film was evaluated by the methods described above.

The evaluation results are shown in Table 3.

Example 31

A heat-treated gas barrier layered film was obtained by heat treating the gas barrier layered film obtained in Example 27 for 60 minutes at 200° C. Linear low-density polyethylene film was then affixed to the resulting heat-treated gas barrier layered film to obtain a multilayer film. The resulting multilayer film was evaluated by the methods described above.

The evaluation results are shown in Table 3.

Example 32

A heat-treated gas barrier layered film was obtained by heat treating the gas barrier layered film obtained in Example 28 for 60 minutes at 200° C. Linear low-density polyethylene film was then affixed to the resulting heat-treated gas barrier layered film to obtain a multilayer film. The resulting multilayer film was evaluated by the methods described above.

The evaluation results are shown in Table 3.

Example 33

The 12 μm-thick biaxially oriented polyester film (Unitika Co., Emblet PET12®) used as the base film in Example 13 was replaced with a 12 μm-thick aluminum oxide-deposited biaxially oriented polyethylene terephthalate film (deposited PET: Tohcello, TL-PET H®), which was polymerized by exposure to UV at intensity 1760 mW/cm$^2$, light quantity 300 mJ/cm$^2$ using an electrodeless UV exposure unit (Fusion Co., CV-110Q-G, type F600V-10) as the UV exposure unit, to obtain a gas barrier layered film having a gas barrier film layer. Linear low-density polyethylene film was then affixed to the resulting gas barrier layered film by the methods described above to obtain a multilayer film. The resulting multilayer film was evaluated by the methods described above.

Example 34

The gas barrier layered film obtained in Example 33 was further exposed to UV using an electrodeless UV exposure unit, to obtain a UV-treated gas barrier layered film. Linear low-density polyethylene film was then affixed to the resulting UV-treated gas barrier layered film by the methods described above to obtain a multilayer film. The resulting multilayer film was evaluated by the methods described above.

TABLE 3

| Example | Modified PVA (B) etc. | Solids weight % Zinc acrylate | Mod. PVA etc. | Treatment temperature (° C.) | Treatment time (minutes) | Repeated UV | Permeation g/(m$^2$/day) | Notes |
|---|---|---|---|---|---|---|---|---|
| Example 27 | B1-5 | 87.5 | 12.5 | — | — | — | 1.2 | Note 1 |
| Example 28 | B3-1 | 87.5 | 12.5 | — | — | — | 0.5 | Note 1 |
| Example 29 | B1-5 | 87.5 | 12.5 | 120 | 10 | — | 1.0 | Note 1 |
| Example 30 | B1-5 | 87.5 | 12.5 | 150 | 10 | — | 0.5 | Note 1 |
| Example 31 | B1-5 | 87.5 | 12.5 | 200 | 60 | — | 0.1 | Note 1 |
| Example 32 | B3-1 | 87.5 | 12.5 | 200 | 60 | — | 0.1 | Note 2 |
| Example 33 | B1-5 | 87.5 | 12.5 | — | — | — | 1.3 | Note 2 |
| Example 34 | B1-5 | 87.5 | 12.5 | — | — | Yes | 0.4 | Note 2 |

Example 35

The aforementioned acrylic acid Zn salt solution (X) was applied to 3.5 g/m$^2$ (as solids) with a Meyer bar on the corona treated surface of a substrate film consisting of 12 μm-thick biaxially oriented polyester film (Unitika Co., Emblet PET12®), fixed on a stainless steel plate with the coated surface up, and immediately polymerized by exposure to ultraviolet rays under conditions of UV strength 180 mW/cm$^2$, cumulative light 180 mJ/cm$^2$ using a UV irradiator (Eye Graphics Eye Grandage type ECS 301G1) to obtain a gas barrier layered film having a layer of gas barrier film. The resulting gas barrier layered film was heat treated in an oven at 200° C. for 60 minutes.

Next, a urethane adhesive [12 pts wt polyurethane adhesive (Mitsui Takeda Chemicals, trade name Takelac A310), 1 pt wt isocyanate curing agent (Mitsui Takeda Chemicals, trade name Takenate A3), 7 pts wt ethyl acetate (Kanto Chemical)] was coated and dried on one side of a 50 μm-thick linear low-density polyethylene film (Tohcello, T.U.X. FCS®), and the surface of the acrylic acid polyvalent metal salt polymer layer (unsaturated carboxylic acid compound polyvalent metal salt polymer layer) of the gas barrier layered film was affixed (dry laminated) thereto to obtain a multilayer film.

The moisture resistance of the resulting gas barrier layered film is shown in Table 4.

Example 36

A gas barrier layered film was obtained as in Example 35 except that heat treatment was for 60 minutes at 150° C.

The moisture resistance of the resulting gas barrier layered film is shown in Table 4.

Example 37

A multilayer film was obtained as in Example 36 except that heat treatment was for 60 minutes at 100° C.

The moisture resistance of the resulting multilayer film is shown in Table 4.

Example 38

A multilayer film was obtained as in Example 36 except that heat treatment was for 30 minutes at 150° C.

The moisture resistance of the resulting multilayer film is shown in Table 4.

Example 39

A multilayer film was obtained as in Example 1 except that a gas barrier layered film with a gas barrier film layer was obtained by polymerization by exposure to UV at intensity 1760 mW/cm$^2$, light quantity 560 mJ/cm$^2$ using an electrodeless UV irradiator (Fusion Co., CV-110Q-G, type F600V-10) as the UV exposure unit.

The moisture resistance of the resulting gas barrier layered film is shown in Table 4.

Example 40

A multilayer film was obtained as in Example 39 except that heat treatment was for 60 minutes at 150° C.

The moisture resistance of the resulting gas barrier layered film is shown in Table 4.

Example 41

A multilayer film was obtained as in Example 39 except that heat treatment was for 60 minutes at 100° C.

The moisture resistance of the resulting gas barrier layered film is shown in Table 4.

TABLE 4

| Example | Coating material | Treatment temperature (° C.) | Treatment time (minutes) | Permeation g/(m$^2$/day) | Notes |
|---|---|---|---|---|---|
| Example 35 | Zinc acrylate monomer | 200 | 60 | 3.27 | Note 1 |
| Example 36 | Zinc acrylate monomer | 150 | 60 | 4.05 | Note 1 |
| Example 37 | Zinc acrylate monomer | 100 | 60 | 6.12 | Note 1 |
| Example 38 | Zinc acrylate monomer | 150 | 30 | 4.88 | Note 1 |
| Example 39 | Zinc acrylate monomer | 200 | 60 | 1.51 | Note 2 |
| Example 40 | Zinc acrylate monomer | 150 | 60 | 1.61 | Note 2 |
| Example 41 | Zinc acrylate monomer | 100 | 60 | 2.81 | Note 2 |

Notes 1 and 2 below apply to Tables 3 and 4.
*Note 1:
Polymerized by exposure to UV using a UV irradiator (Eye Graphics Eye Grandage type ECS 301G1)
*Note 2:
Polymerized by exposure to UV using a UV irradiator (Fusion Co., CV-110Q-G, type F600V-10)

As shown in Table 4, the gas barrier layered films (Examples 35 to 41) obtained by heat-treating films obtained by polymerizing unsaturated carboxylic acid compound polyvalent metal salt solutions applied to substrate layers had excellent oxygen barrier properties.

As shown in Table 1, the oxygen barrier properties under low humidity conditions were better in systems having a modified vinyl alcohol polymer added thereto, and hot water resistance was also improved with no delamination due to boiling (Examples 1 to 21), while without such addition (Reference Example 1), the oxygen barrier properties and hot water resistance were excellent at 90% RH but the oxygen barrier properties were inferior under low humidity conditions. In systems having polyvinyl alcohol added thereto (Reference Examples 2, 3), the barrier properties under low humidity conditions were better than without such addition, but hot water resistance was poor, and there was delamination due to boiling.

As shown in Table 2, films with excellent oxygen barrier properties under both high humidity and low humidity conditions and with excellent hot water resistance can be obtained by forming polymer (A) on a transparent aluminum oxide deposition layer (Examples 22, 25, 26). It was also shown that properties equivalent to those obtained with biaxially oriented PET film can be obtained with either biaxially oriented polypropylene film (Example 23) or biaxially oriented polyamide film (Example 24).

As shown in Tables 3 and 4, moisture resistance is improved by heat treatment.

INDUSTRIAL APPLICABILITY

Because a gas barrier film consisting of a polymer of an unsaturated carboxylic acid compound polyvalent metal salt, wherein the polymer also contains a modified vinyl alcohol polymer, and a gas barrier laminate formed with this gas barrier film of the present invention have excellent oxygen permeation resistance (gas barrier properties) under high humidity and low humidity conditions, they can be used as packaging materials for a variety of products and as protective materials for materials that are at risk from oxygen gas permeation and moisture, such as electronic materials, precision parts, drugs and the like, including packaging materials for dried foods, water, boil-in-bag packages, supplemental foods and the like and particularly food packaging materials for contents that require strong gas barrier properties, packaging materials for shampoos, detergents, bath additives, perfumes and other toiletries, medical applications such as packaging bags and packaging container parts for powders, granules, pills and other drugs and infusion packs and other liquid medicines, packages for hard discs, wiring boards, printed boards and other electronic parts, barrier members for liquid crystal displays, plasma displays, inorganic and organic EL displays, electronic papers and other flat panel displays and other electronic materials, and barrier members for solar batteries, barrier members for vacuum insulators, packaging materials for ink cartridges and other industrial products and the like.

The invention claimed is:

1. A gas barrier film comprising a polymer (A) of an unsaturated carboxylic acid compound polyvalent metal salt (a), the unsaturated carboxylic acid compound (a) having a degree of polymerization of less than 20, and
    30 to 0.01 wt % of at least one type of modified vinyl alcohol polymer (B) selected from a (meth)acrylate group-modified vinyl alcohol polymer (B1), a thiol group-modified vinyl alcohol polymer (B2), a silyl group-modified vinyl alcohol polymer (B3), and an acetoacetyl group-modified vinyl alcohol polymer (B4).

2. The gas barrier film according to claim 1, wherein the ratio of absorbance $A_0$ near 1700 cm$^{-1}$ attributable to the vC=O of the carboxyl acid groups in an infrared absorption spectrum to absorbance A near 1520 cm$^{-1}$ attributable to the vC=O of the carboxylate ions ($A_0/A$) is less than 0.25.

3. A gas barrier laminate obtained by forming the gas barrier film according to claim 1 on at least one side of a substrate layer (C).

4. The gas barrier laminate according to claim 3, wherein the substrate layer (C) is a substrate layer having an inorganic compound deposition layer (D) formed thereon.

5. The gas barrier film according to claim 1, which is heat treated.

6. A method for manufacturing a gas barrier film or gas barrier laminate by coating at least one surface of a substrate or a substrate layer (C) with a solution of a polyvalent metal salt of an unsaturated carboxylic acid compound having a degree of polymerization of less than 20, which contains 30 to 0.01 wt % of at least one type of a modified vinyl alcohol polymer (B) selected from a (meth)acrylate group-modified vinyl alcohol polymer (B1), a thiol group-modified vinyl alcohol polymer (B2), a silyl group-modified vinyl alcohol polymer (B3), and a acetoacetyl group-modified vinyl alcohol polymer (B4); and then forming a polymer (A) of an unsaturated carboxylic acid compound polyvalent salt (a), the unsaturated carboxylic acid compound polyvalent metal salt (a) having a degree of polymerization of less than 20, and the polymer (A) containing a modified vinyl alcohol polymer (B).

7. A method for manufacturing a gas barrier film or gas barrier laminate by coating at least one surface of a substrate or a substrate layer (C) with a solution containing at least one type of modified vinyl alcohol polymer (B) selected from a (meth)acrylate group-modified vinyl alcohol polymer (B1), a thiol group-modified vinyl alcohol polymer (B2), a silyl group-modified vinyl alcohol polymer (B3), and an acetoacetyl group-modified vinyl alcohol polymer (B4), an unsaturated carboxylic acid compound with a degree of polymerization of less than 20 and a polyvalent metal compound, and then forming a polymer (A) of an unsaturated carboxylic acid compound polyvalent metal salt (a), the unsaturated carboxylic acid compound polyvalent metal salt (a) having a degree of polymerization of less than 20, and the polymer (A) containing 30 to 0.01 wt % of the modified vinyl alcohol polymer (B).

8. The method for manufacturing a gas barrier laminate according to claim 6 or 7, wherein the substrate layer (C) is a substrate layer having an inorganic compound deposition layer (D) formed thereon.

9. A gas barrier laminate obtained by the manufacturing method according to claim 6 or 7.

10. A method for manufacturing a gas barrier film by further heat treating a film obtained by first coating a substrate layer with a solution of a polyvalent metal salt of an unsaturated carboxylic acid compound having a degree of polymerization of less than 20, and then polymerizing the unsaturated carboxylic acid compound polyvalent metal salt wherein the polymerized unsaturated carboxylic acid compound polyvalent metal salt contains 30 to 0.01 wt % of at least one of type of modified vinyl alcohol polymer (B) selected from a (meth)acrylate group-modified vinyl alcohol polymer (B1), a thiol group-modified vinyl alcohol polymer (B2), a silyl group-modified vinyl alcohol polymer (B3), and an acetoacetyl group-modified vinyl alcohol polymer (B4).

11. A method for manufacturing a gas barrier film by further heat treating a film obtained by coating a substrate layer with a solution containing an unsaturated carboxylic acid compound with a degree of polymerization of less than 20 and a polyvalent metal compound, and by forming an unsaturated carboxylic acid compound polyvalent metal salt, and then polymerizing the unsaturated carboxylic acid compound polyvalent metal salt wherein the polymerized unsaturated carboxylic acid compound polyvalent metal salt contains 30 to 0.01 wt % of at least one of type of modified vinyl alcohol polymer (B) selected from a (meth)acrylate group-modified vinyl alcohol polymer (B1), a thiol group-modified vinyl alcohol polymer (B2), a silyl group-modified vinyl alcohol polymer (B3), and an acetoacetyl group-modified vinyl alcohol polymer (B4).

* * * * *